United States Patent
De Atley et al.

(10) Patent No.: US 11,263,020 B2
(45) Date of Patent: Mar. 1, 2022

(54) SYSTEM AND METHOD FOR WIPING ENCRYPTED DATA ON A DEVICE HAVING FILE-LEVEL CONTENT PROTECTION

(71) Applicant: Apple Inc., Cupertino, CA (US)

(72) Inventors: Dallas Blake De Atley, San Francisco, CA (US); Gordon Freedman, Palo Alto, CA (US); Thomas Brogan Duffy, Jr., San Francisco, CA (US); Tahoma Madrone Toelkes, San Jose, CA (US); Michael John Smith, San Jose, CA (US); Paul William Chinn, San Jose, CA (US); David Rahardja, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 16/017,940

(22) Filed: Jun. 25, 2018

(65) Prior Publication Data
US 2019/0026117 A1    Jan. 24, 2019

Related U.S. Application Data

(63) Continuation of application No. 14/992,798, filed on Jan. 11, 2016, now Pat. No. 10,025,597, which is a (Continued)

(51) Int. Cl.
*G06F 9/4401* (2018.01)
*H04L 9/08* (2006.01)
(Continued)

(52) U.S. Cl.
CPC .......... *G06F 9/4406* (2013.01); *G06F 9/4401* (2013.01); *G06F 21/602* (2013.01);
(Continued)

(58) Field of Classification Search
CPC .... G06F 21/602; G06F 9/4401; G06F 9/4406; H04L 2209/80; H04L 9/0816;
(Continued)

(56) References Cited

U.S. PATENT DOCUMENTS 4,757,534 A * 7/1988 Matyas ............... G06F 12/1408
380/281
5,412,723 A   5/1995 Canetti et al.
(Continued)

OTHER PUBLICATIONS

Search Query Report from IP.com (performed Sep. 25, 2020) (Year: 2020).*
(Continued)

*Primary Examiner* — Sharon S Lynch
(74) *Attorney, Agent, or Firm* — Dickinson Wright RLLP

(57) ABSTRACT

Disclosed herein are systems, methods, and non-transitory computer-readable storage media for erasing user data stored in a file system. The method includes destroying all key bags containing encryption keys on a device having a file system encrypted on a per file and per class basis, erasing and rebuilding at least part of the file system associated with user data, and creating a new default key bag containing encryption keys. Also disclosed herein is a method of erasing user data stored in a remote file system encrypted on a per file and per class basis. The method includes transmitting obliteration instructions to a remote device, which cause the remote device to destroy all key bags containing encryption keys on the remote device, erase and rebuild at least part of the file system associated with user data, and create on the remote device a new default key bag containing encryption keys.

17 Claims, 16 Drawing Sheets

Related U.S. Application Data continuation of application No. 14/299,359, filed on Jun. 9, 2014, now Pat. No. 9,237,016, which is a continuation of application No. 13/941,373, filed on Jul. 12, 2013, now Pat. No. 8,756,419, which is a continuation of application No. 12/756,153, filed on Apr. 7, 2010, now Pat. No. 8,510,552.

(51) Int. Cl.
| | |
|---|---|
| *H04W 12/04* | (2021.01) |
| *H04L 9/12* | (2006.01) |
| *H04L 9/32* | (2006.01) |
| *H04W 12/082* | (2021.01) |
| *G06F 21/60* | (2013.01) |
| *H04L 9/30* | (2006.01) |
| *H04W 12/02* | (2009.01) |
| *H04W 12/06* | (2021.01) |

(52) U.S. Cl.
CPC .......... *H04L 9/0816* (2013.01); *H04L 9/0891* (2013.01); *H04L 9/0894* (2013.01); *H04L 9/12* (2013.01); *H04L 9/30* (2013.01); *H04L 9/3226* (2013.01); *H04W 12/04* (2013.01); *H04W 12/082* (2021.01); *H04L 2209/80* (2013.01); *H04W 12/02* (2013.01); *H04W 12/06* (2013.01)

(58) Field of Classification Search
CPC ....... H04L 9/0891; H04L 9/0894; H04L 9/12; H04L 9/30; H04L 9/3226; H04W 12/02; H04W 12/04; H04W 12/06; H04W 12/0802
See application file for complete search history.

(56) References Cited

U.S. PATENT DOCUMENTS

| | | | | |
|---|---|---|---|---|
| 5,495,533 A | * | 2/1996 | Linehan | G06F 21/31 380/277 |
| 5,699,428 A | | 12/1997 | McDonnal et al. | |
| 5,787,169 A | * | 7/1998 | Eldridge | G06F 21/40 380/286 |
| 5,787,175 A | * | 7/1998 | Carter | G06F 21/6209 707/999.008 |
| 5,870,477 A | * | 2/1999 | Sasaki | G06F 21/606 380/277 |
| 5,953,419 A | | 9/1999 | Lohstroh et al. | |
| 6,185,304 B1 | | 2/2001 | Coppersmith et al. | |
| 6,249,866 B1 | | 6/2001 | Brundrett et al. | |
| 6,367,010 B1 | | 4/2002 | Venkatram et al. | |
| 6,389,555 B2 | | 5/2002 | Purcell et al. | |
| 6,560,337 B1 | | 5/2003 | Peyravian et al. | |
| 6,658,566 B1 | | 12/2003 | Hazard | |
| 6,735,313 B1 | | 5/2004 | Bleichenbacher et al. | |
| 6,857,076 B1 | | 2/2005 | Klein | |
| 6,889,210 B1 | | 5/2005 | Vainstein | |
| 6,981,138 B2 | * | 12/2005 | Douceur | H04L 9/0825 380/277 |
| 6,985,583 B1 | | 1/2006 | Brainard et al. | |
| 7,010,689 B1 | * | 3/2006 | Matyas, Jr | H04L 9/3073 713/168 |
| 7,047,426 B1 | | 5/2006 | Andrews et al. | |
| 7,093,137 B1 | * | 8/2006 | Sato | G06F 21/6227 380/277 |
| 7,178,021 B1 | * | 2/2007 | Hanna | G06F 21/6209 713/150 |
| 7,197,638 B1 | | 3/2007 | Grawrock et al. | |
| 7,266,699 B2 | | 9/2007 | Newman | G06F 21/6227 713/182 |
| 7,350,081 B1 | | 3/2008 | Best | |
| 7,472,280 B2 | * | 12/2008 | Giobbi | G06F 21/10 380/223 |
| 7,515,717 B2 | | 4/2009 | Doyle et al. | |
| 7,536,355 B2 | | 5/2009 | Barr et al. | |
| 7,596,696 B1 | * | 9/2009 | Perlman | H04L 9/083 713/165 |
| 7,703,140 B2 | * | 4/2010 | Nath | H04L 63/0428 726/26 |
| 7,711,122 B2 | * | 5/2010 | Allen | H04L 9/0825 380/286 |
| 7,921,284 B1 | | 4/2011 | Kinghorn et al. | |
| 7,984,025 B2 | * | 7/2011 | Valfridsson | G06F 21/6227 707/689 |
| 8,045,714 B2 | * | 10/2011 | Cross | G06F 21/6209 380/277 |
| 8,130,963 B2 | | 3/2012 | Deaver et al. | |
| 8,140,847 B1 | * | 3/2012 | Wu | H04L 9/3263 713/175 |
| 8,181,028 B1 | | 5/2012 | Hernacki et al. | |
| 8,200,964 B2 | | 6/2012 | Perlman et al. | |
| 8,254,571 B1 | | 8/2012 | Boyen | |
| 8,290,165 B2 | * | 10/2012 | Allen | H04L 9/3228 380/278 |
| 8,327,138 B2 | * | 12/2012 | Nath | H04L 63/06 713/165 |
| 8,335,920 B2 | * | 12/2012 | Jevans | G06F 21/41 713/163 |
| 8,352,679 B2 | * | 1/2013 | Wolfe | G06F 12/0808 711/118 |
| 8,412,934 B2 | | 4/2013 | De Atley et al. | |
| 8,433,901 B2 | | 4/2013 | De Atley et al. | |
| 8,510,552 B2 | | 8/2013 | De Atley et al. | |
| 8,589,680 B2 | | 11/2013 | De Atley et al. | |
| 8,645,715 B2 | * | 2/2014 | Dawson | H04L 9/0822 713/193 |
| 8,756,419 B2 | | 6/2014 | De Atley et al. | |
| 8,788,842 B2 | | 7/2014 | Brouwer et al. | |
| 8,798,272 B2 | * | 8/2014 | Cross | H04L 9/0891 380/277 |
| 8,826,023 B1 | | 9/2014 | Harmer | |
| 8,904,180 B2 | * | 12/2014 | Allen | H04L 9/0825 713/171 |
| 8,995,665 B1 | | 3/2015 | Tsaur et al. | |
| 9,158,933 B2 | * | 10/2015 | Banks | H04L 9/0863 |
| 9,237,016 B2 | | 1/2016 | De Atley et al. | |
| 9,288,047 B2 | | 3/2016 | Brouwer et al. | |
| 9,912,476 B2 | | 3/2018 | Brouwer et al. | |
| 9,940,449 B2 | * | 4/2018 | McNulty | G06F 21/6272 |
| 10,025,597 B2 | | 7/2018 | De Atley et al. | |
| 2001/0002487 A1 | | 5/2001 | Grawrock et al. | |
| 2001/0021255 A1 | | 9/2001 | Ishibashi | |
| 2001/0047341 A1 | | 11/2001 | Thoone et al. | |
| 2001/0056541 A1 | | 12/2001 | Matsuzaki et al. | |
| 2002/0016912 A1 | * | 2/2002 | Johnson | G06F 21/6218 713/165 |
| 2002/0019935 A1 | | 2/2002 | Andrew et al. | |
| 2002/0023215 A1 | | 2/2002 | Wang et al. | |
| 2002/0023232 A1 | | 2/2002 | Serani et al. | |
| 2002/0071563 A1 | | 6/2002 | Kum et al. | |
| 2002/0107877 A1 | | 8/2002 | Whiting et al. | |
| 2002/0126850 A1 | * | 9/2002 | Allen | H04L 9/3228 380/277 |
| 2002/0138722 A1 | * | 9/2002 | Douceur | H04L 9/0894 713/153 |
| 2002/0138750 A1 | | 9/2002 | Gibbs et al. | |
| 2002/0141588 A1 | | 10/2002 | Rollins | |
| 2002/0144116 A1 | * | 10/2002 | Giobbi | H04N 21/4627 713/168 |
| 2003/0028592 A1 | | 2/2003 | Ooho et al. | |
| 2003/0046572 A1 | * | 3/2003 | Newman | H04L 9/0891 713/193 |
| 2003/0088783 A1 | | 5/2003 | DiPierro | |
| 2003/0097596 A1 | | 5/2003 | Muratov et al. | |
| 2003/0108204 A1 | | 6/2003 | Audebert et al. | |
| 2003/0126434 A1 | | 7/2003 | Lim et al. | |
| 2003/0167395 A1 | | 9/2003 | Chang et al. | |
| 2003/0177401 A1 | | 9/2003 | Arnold et al. | |
| 2003/0198351 A1 | | 10/2003 | Foster et al. | |
| 2003/0210791 A1 | | 11/2003 | Binder | |
| 2003/0229782 A1 | | 12/2003 | Bible, Jr. et al. | |

(56) References Cited

U.S. PATENT DOCUMENTS

| | | |
|---|---|---|
| 2004/0088592 A1 | 5/2004 | Rizzo et al. |
| 2004/0091114 A1* | 5/2004 | Carter ................ G06F 21/6218 380/259 |
| 2004/0123127 A1 | 6/2004 | Teicher et al. |
| 2004/0146163 A1 | 7/2004 | Asokan et al. |
| 2004/0187012 A1 | 9/2004 | Kohiyama et al. |
| 2004/0204003 A1 | 10/2004 | Soerensen et al. |
| 2004/0236776 A1 | 11/2004 | Peace |
| 2004/0236958 A1 | 11/2004 | Teicher et al. |
| 2004/0260923 A1 | 12/2004 | Nakai et al. |
| 2005/0071275 A1* | 3/2005 | Vainstein ............... H04L 9/0822 705/51 |
| 2005/0071658 A1* | 3/2005 | Nath ................... H04L 63/0428 713/193 |
| 2005/0081041 A1 | 4/2005 | Hwang |
| 2005/0097509 A1 | 5/2005 | Rong et al. |
| 2005/0114686 A1 | 5/2005 | Ball et al. |
| 2005/0138360 A1* | 6/2005 | Kamalakantha .... G06F 21/6218 713/156 |
| 2005/0157880 A1* | 7/2005 | Kurn ........................ H04L 63/10 380/279 |
| 2005/0159184 A1* | 7/2005 | Kerner ................ H04L 63/0853 455/558 |
| 2005/0172123 A1* | 8/2005 | Carpentier ............... G06F 21/60 713/165 |
| 2005/0182952 A1 | 8/2005 | Shinozaki |
| 2005/0191988 A1 | 9/2005 | Thornton et al. |
| 2005/0193198 A1 | 9/2005 | Livowsky |
| 2005/0228994 A1 | 10/2005 | Kasai et al. |
| 2005/0235143 A1 | 10/2005 | Kelly |
| 2005/0235148 A1 | 10/2005 | Scheidt et al. |
| 2005/0244001 A1 | 11/2005 | Kitani et al. |
| 2005/0251866 A1 | 11/2005 | Kobayashi et al. |
| 2005/0268107 A1* | 12/2005 | Harris ................. H04L 63/0861 713/182 |
| 2005/0289347 A1 | 12/2005 | Ovadia |
| 2006/0015745 A1 | 1/2006 | Sukigara et al. |
| 2006/0021007 A1 | 1/2006 | Rensin et al. |
| 2006/0021059 A1 | 1/2006 | Brown et al. |
| 2006/0059344 A1 | 3/2006 | Mononen |
| 2006/0062384 A1 | 3/2006 | Dondeti |
| 2006/0090082 A1 | 4/2006 | Apostolopoulos |
| 2006/0093150 A1 | 5/2006 | Reddy et al. |
| 2006/0104449 A1 | 5/2006 | Akkermans et al. |
| 2006/0120520 A1 | 6/2006 | Suzuki et al. |
| 2006/0149962 A1 | 7/2006 | Fountain et al. |
| 2006/0159260 A1 | 7/2006 | Pereira et al. |
| 2006/0179309 A1* | 8/2006 | Cross ................... G06F 21/6281 713/168 |
| 2006/0195692 A1 | 8/2006 | Kuhlman et al. |
| 2006/0195909 A1* | 8/2006 | Boswell ................. H04N 5/913 726/26 |
| 2006/0242423 A1* | 10/2006 | Kussmaul ............... H04L 9/3231 713/182 |
| 2006/0291660 A1 | 12/2006 | Gehrmann et al. |
| 2007/0005974 A1 | 1/2007 | Kudou |
| 2007/0016958 A1 | 1/2007 | Bodepudi et al. |
| 2007/0038857 A1 | 2/2007 | Gosnell |
| 2007/0058807 A1 | 3/2007 | Marsh |
| 2007/0074037 A1 | 3/2007 | Eckleder |
| 2007/0083785 A1 | 4/2007 | Sutardja |
| 2007/0086586 A1 | 4/2007 | Jakubowski et al. |
| 2007/0086593 A1* | 4/2007 | Denning ............... H04L 9/0872 380/286 |
| 2007/0100913 A1* | 5/2007 | Sumner ............... G06F 21/6227 |
| 2007/0106903 A1 | 5/2007 | Scheidt et al. |
| 2007/0116286 A1 | 5/2007 | Yuan et al. |
| 2007/0116287 A1 | 5/2007 | Rasizade et al. |
| 2007/0116288 A1 | 5/2007 | Rasizade et al. |
| 2007/0124321 A1 | 5/2007 | Szydlo |
| 2007/0189540 A1 | 8/2007 | Tarkkala |
| 2007/0195957 A1 | 8/2007 | Arulambalam et al. |
| 2007/0203957 A1 | 8/2007 | Desai et al. |
| 2007/0214370 A1 | 9/2007 | Sato et al. |
| 2007/0279227 A1* | 12/2007 | Juels ..................... H04L 9/3226 340/572.1 |
| 2007/0281664 A1 | 12/2007 | Kaneko et al. |
| 2007/0294529 A1 | 12/2007 | Blair et al. |
| 2007/0300052 A1* | 12/2007 | Jevans ................... G06F 21/41 713/1 |
| 2008/0010455 A1 | 1/2008 | Holtzman et al. |
| 2008/0034205 A1 | 2/2008 | Alain et al. |
| 2008/0034224 A1 | 2/2008 | Ferren et al. |
| 2008/0052541 A1* | 2/2008 | Ginter ................... G06F 21/572 713/194 |
| 2008/0065909 A1 | 3/2008 | Chen |
| 2008/0092239 A1* | 4/2008 | Sitrick ............. H04N 21/63345 726/27 |
| 2008/0107262 A1 | 5/2008 | Helfman et al. |
| 2008/0114990 A1* | 5/2008 | Hilbert ................... G06F 21/78 713/189 |
| 2008/0123843 A1 | 5/2008 | Machani |
| 2008/0123858 A1 | 5/2008 | Perlman et al. |
| 2008/0130893 A1 | 6/2008 | Ibrahim et al. |
| 2008/0137861 A1 | 6/2008 | Lindmo et al. |
| 2008/0181412 A1 | 7/2008 | Acar et al. |
| 2008/0189549 A1 | 8/2008 | Hughes |
| 2008/0219453 A1 | 9/2008 | Chang et al. |
| 2008/0226082 A1* | 9/2008 | Brunet ................... H04L 9/0897 380/277 |
| 2008/0228821 A1 | 9/2008 | Mick et al. |
| 2008/0232598 A1* | 9/2008 | Vennelakanti ........ G06F 21/602 380/279 |
| 2008/0235772 A1 | 9/2008 | Janzen |
| 2008/0260159 A1 | 10/2008 | Osaki |
| 2008/0310633 A1 | 12/2008 | Brown et al. |
| 2009/0019293 A1 | 1/2009 | Perlman |
| 2009/0067633 A1* | 3/2009 | Dawson ................. H04L 9/0822 380/279 |
| 2009/0075630 A1* | 3/2009 | Mclean ................ H04L 63/0428 455/411 |
| 2009/0086964 A1 | 4/2009 | Agrawal et al. |
| 2009/0092252 A1* | 4/2009 | Noll ....................... H04L 9/0891 380/277 |
| 2009/0132552 A1* | 5/2009 | Adya ..................... G06F 16/957 |
| 2009/0138948 A1 | 5/2009 | Calamera et al. |
| 2009/0217056 A1 | 8/2009 | Malpani |
| 2009/0259854 A1 | 10/2009 | Cox et al. |
| 2010/0014676 A1 | 1/2010 | McCarthy et al. |
| 2010/0037069 A1 | 2/2010 | Deierling et al. |
| 2010/0040231 A1 | 2/2010 | Jin et al. |
| 2010/0058055 A1 | 3/2010 | Hair |
| 2010/0058067 A1 | 3/2010 | Schneider |
| 2010/0093308 A1 | 4/2010 | Cohan |
| 2010/0098249 A1 | 4/2010 | Shin et al. |
| 2010/0131775 A1* | 5/2010 | Jogand-Coulomb ........................ G11B 20/00253 713/193 |
| 2010/0162000 A1 | 6/2010 | Masui et al. |
| 2010/0169670 A1 | 7/2010 | Sip |
| 2010/0172504 A1* | 7/2010 | Allen ..................... H04L 9/0897 380/286 |
| 2010/0199088 A1* | 8/2010 | Nath ..................... G06F 21/6218 713/167 |
| 2010/0208888 A1 | 8/2010 | Weber |
| 2010/0228989 A1* | 9/2010 | Neystadt ............. G06F 21/6209 713/185 |
| 2010/0263056 A1 | 10/2010 | Schull |
| 2010/0266132 A1* | 10/2010 | Bablani ................. H04W 12/126 380/286 |
| 2010/0268948 A1 | 10/2010 | Matsukawa et al. |
| 2010/0281223 A1* | 11/2010 | Wolfe ................... G06F 12/1408 711/133 |
| 2010/0325051 A1 | 12/2010 | Etchegoyen |
| 2010/0325423 A1* | 12/2010 | Etchegoyen ........ H04L 63/0428 713/153 |
| 2011/0169654 A1* | 7/2011 | Ketari ................. G08B 13/1427 340/687 |
| 2011/0191837 A1 | 8/2011 | Guajardo Merchan et al. |
| 2011/0208977 A1 | 8/2011 | Roberts et al. |

(56) References Cited

U.S. PATENT DOCUMENTS

| | | | |
|---|---|---|---|
| 2011/0252232 A1* | 10/2011 | De Atley | G06F 21/6218 713/165 |
| 2011/0252233 A1* | 10/2011 | De Atley | H04L 9/0894 713/165 |
| 2011/0252236 A1* | 10/2011 | De Atley | G06F 16/178 713/168 |
| 2012/0066738 A1 | 3/2012 | Cohan | |
| 2012/0137130 A1 | 5/2012 | Vainstein et al. | |
| 2012/0328149 A1 | 12/2012 | Chen et al. | |
| 2013/0007426 A9* | 1/2013 | Jevans | G06F 21/34 713/1 |
| 2013/0034229 A1 | 2/2013 | Sauerwald et al. | |
| 2013/0046985 A1* | 2/2013 | Allen | H04L 9/0825 713/171 |
| 2013/0208893 A1* | 8/2013 | Shablygin | H04L 9/3213 380/277 |
| 2013/0290734 A1 | 10/2013 | Branton et al. | |
| 2014/0095869 A1 | 4/2014 | Oltmans et al. | |
| 2015/0326569 A1* | 11/2015 | McNulty | H04L 9/0894 713/171 |
| 2016/0269440 A1* | 9/2016 | Hartman | H04L 9/14 |
| 2016/0330024 A1 | 11/2016 | Brouwer et al. | |

OTHER PUBLICATIONS

Search Query Report from IP.com (performed Apr. 1, 2021) (Year: 2021).*

STIC Request Search Report (Requested Jul. 23, 2021) (Year: 2021).*

Search Query Report from IP.com (performed Sep. 27, 2021) (Year: 2021).*

Kaliski; "PKCS #5 v2.0: Password-Based Cryptography Standard," Mar. 25, 1999, RSA Laboratories, Version 2.0, pp. 1-30.

Menezes, Alfred J. et al, "Handbook of Applied Cryptography," 1997, CRC Press LLC, pp. 228-231.

* cited by examiner

CREATING A BACKUP TICKET

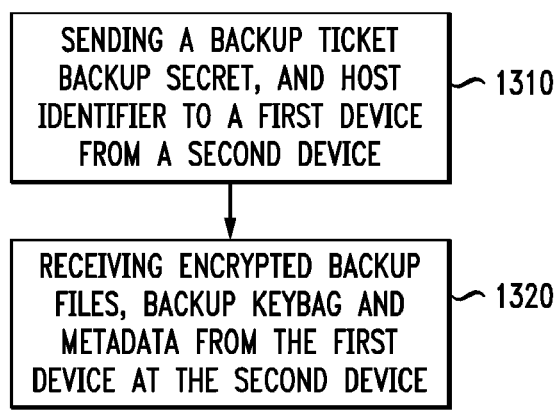
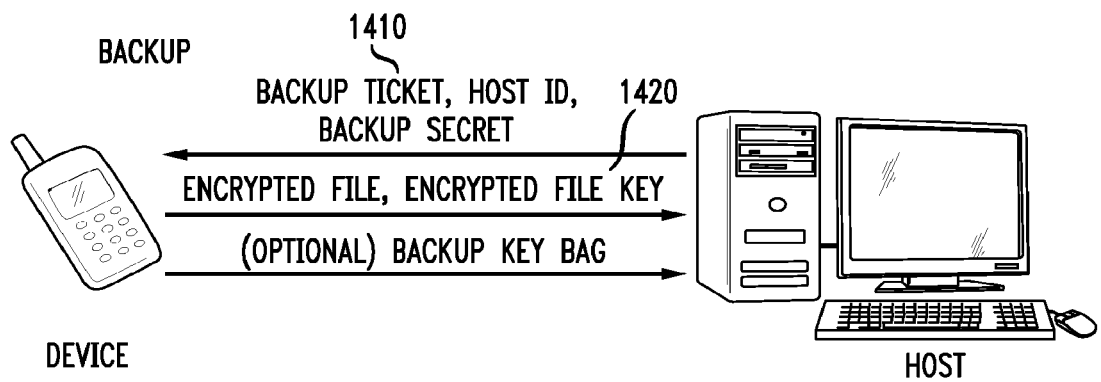

SYSTEM AND METHOD FOR WIPING ENCRYPTED DATA ON A DEVICE HAVING FILE-LEVEL CONTENT PROTECTION

CROSS-REFERENCE TO RELATED APPLICATIONS

This application is a continuation of U.S. application Ser. No. 14/992,798, filed Jan. 11, 2016, now U.S. Pat. No. 10,025,597 issued Jul. 17, 2018, which is a continuation of U.S. application Ser. No. 14/299,359, filed Jun. 9, 2014, now U.S. Pat. No. 9,237,016 issued Jan. 12, 2016, which is a continuation of U.S. application Ser. No. 13/941,373, filed Jul. 12, 2013, now U.S. Pat. No. 8,756,419 issued Jun. 17, 2014, which is a continuation of U.S. application Ser. No. 12/756,153, filed Apr. 7, 2010, now U.S. Pat. No. 8,510,552 issued Aug. 13, 2013, the contents of which are being incorporated herein by reference in their entirety.

FIELD

The present disclosure relates to content protection and more specifically to local and remote wiping of encrypted data on a content-protected device.

BACKGROUND

As more and more individuals and enterprises rely on smartphones and other mobile devices storing confidential or sensitive information, security is an increasing concern. Because such mobile devices are used as communication centers, they frequently contain sensitive information such as contact information, call logs, emails, pictures, and so forth, of high potential value and/or sensitivity. In certain applications, protecting this information is desirable. In some applications, encryption is used to protect sensitive information.

Encryption is the process of transforming a message into ciphertext that cannot be understood by unintended recipients. A message is encrypted with an encryption algorithm and encryption key. Decryption is the process of transforming ciphertext back to the message in a readable or understandable form.

One solution to protect sensitive information on a computing device having a file system for storing files is to encrypt the file system with an encryption key stored on the computing device that protects the entire device storage partition. However, if a device is lost or stolen, an attacker can run his own code on the device to obtain the encryption key. Once the attacker obtains the encryption key, the attacker can decrypt the entire file system and access encrypted sensitive user information. For numerous applications of secure and/or sensitive information, this level of protection is inadequate.

Further, encrypted data requires consideration of additional factors and injects a heightened level of complexity in erasing data. What is needed in the art is a set of improved approaches for wiping data from encrypted file systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for file-level content protection, specifically encryption and key management. A system practicing the method encrypts each file with a unique file encryption key; encrypts each file encryption key with a class encryption key; and encrypts each class encryption key with an additional encryption key.

In one embodiment, the system erases user data stored in a file system, hereafter called obliteration. A system practicing the method destroys all key bags containing encryption keys on a device having file-level content protection, erases and rebuilds at least part of the file system associated with user data and creates a new default key bag containing class encryption keys.

In one aspect, the principles disclosed herein apply to a mobile device. In another aspect, the principles herein apply to a stationary device. Other applications and combinations of the principles disclosed herein also exist, for example protecting system data based on file-level content protection.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 13 illustrates a second exemplary backup method embodiment for a host device;
FIG. 14 illustrates an exemplary backup system configuration.

DETAILED DESCRIPTION

Figure 1:
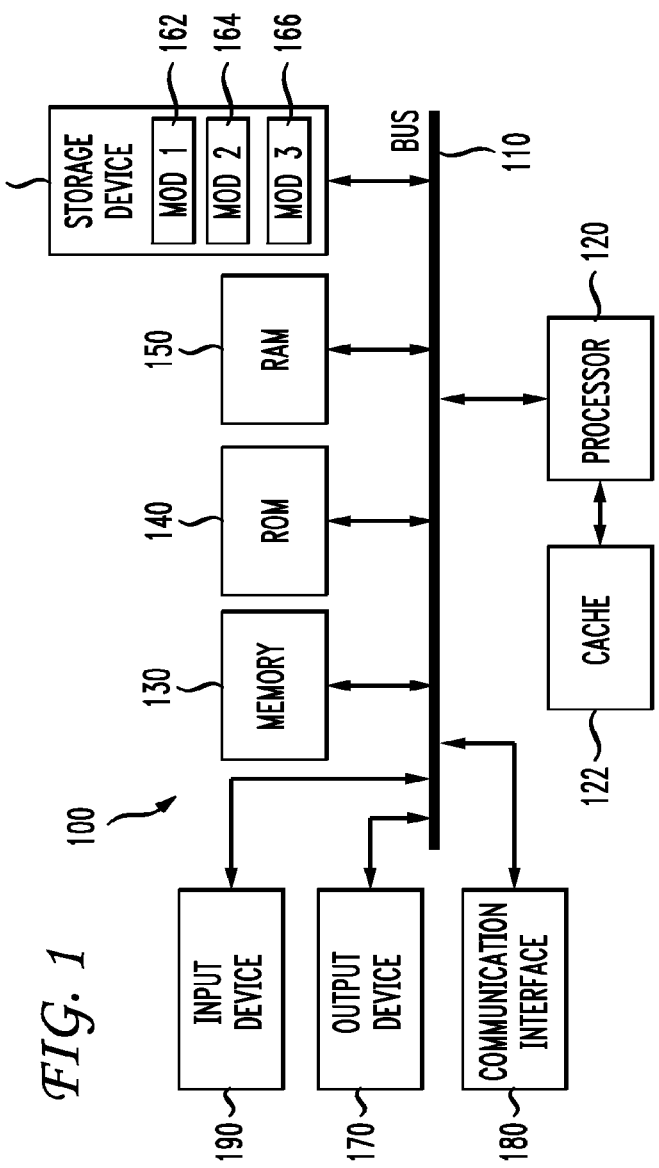
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved encryption approaches. The encryption approaches herein are based on a per-file and per-class encryption or data protection scheme. A brief introductory description with reference to these approaches will be provided, followed by a discussion of a basic, general-purpose system or computing device in FIG. 1 which can be employed to practice all or part of the concepts described herein. A more detailed description of the methods and encryption approaches will then follow.

The data protection features disclosed herein can safeguard user data in the event of a stolen device. Current encryption schemes encrypt all data stored on a device with a single symmetric encryption key that is available when the system is running. Thus, if the device is cracked such that the attacker can run his own code on the device, the user's data is accessible to the attacker.

In one aspect, the approaches set forth herein rely on data encrypted with a secret known only to the user to protect the user's data, such as a passcode. As a result, if the user has enabled data protection but has not entered his passcode since a device reboot, his data will not be accessible to the system. However, this approach introduces a number of complications, mostly surrounding processes that access user data in the background, even while the device is locked, such as email and calendar information. Furthermore, this same set of data is necessary to properly backup, sync and potentially restore the user's data.

In one aspect where the system encrypts all new files on a file system, the data protection feature relies on every file on the data partition being individually encrypted with a unique symmetric encryption key. This encryption mechanism can supplant existing hardware encryption features by taking advantage of the hardware acceleration in the kernel without significant performance degradation. The system uses AES in direct memory access (DMA) so that a memory-to-memory encryption operation is not needed. However, the principles disclosed herein can be performed by a general purpose processor executing appropriate encryption instructions, a special purpose processor designed to perform encryption-based calculations, or a combination thereof.

The system can generate a random 256-bit AES key (or other size or type of key) to associate with a file when the file is created. An AES key is a cryptographic key used to perform encryption and decryption using the Advanced Encryption Standard algorithm. All input and output (I/O) operations performed on that file use that AES key so that the raw file data is only written to the file system in encrypted form. This individual file key accompanies the file as metadata, so that the file and key can be backed up and restored without having to access the file contents. The system can tell if a passcode is in compliance based on the metadata even when the passcode is not stored directly. This feature can be useful, for example, when testing passcode compliance with any local and/or server restrictions on the passcode strength such as an Exchange server password policy.

In one variation, the system defines a new mount option to be used for devices that support content encryption. This mount option instructs the kernel that all new files created on the partition should not be encrypted by default. This option can be used for system partitions, as those files do not need to be encrypted, as well as data partitions for older devices that do not support data protection.

When restoring backed up data to a device, a restore daemon can look for a new option in the device tree that indicates the device does not support data protection. In one implementation, the restore daemon is responsible for laying down the fstab file on the system partition at/private/etc/fstab. The fstab file can contain at least two entries. The first entry instructs the kernel to mount the system partition as a read only volume. The second entry instructs the kernel to mount the data partition at/private/var as a writable volume with the new data protection option. In another implementation, instead of using a new mount option that must explicitly be set in the fstab file, a Hierarchical File System (HFS) option is added in the header. The mounter auto detects that data protection should be turned on.

When a user enters a password, the system uses the entered password to derive a key which is used to decrypt the class keys. Alternatively, the system can derive a key from any user controlled source, such as a dongle. A dongle is a small piece of hardware that connects to a device. Each class key is wrapped with integrity, which allows the system to determine whether the unwrapping proceeded correctly. If the system unwraps all keys correctly, the system accepts the password. In one aspect, the system tries to decrypt all keys to maximize the time spent decrypting.

These and other variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs flash memory storage 160, it should be appreciated by those skilled in the art that other types of computer readable media which can store data that are accessible by a computer, such as a hard disk drive, magnetic cassettes, flash memory, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: 1) a sequence of computer implemented steps, operations, or procedures running on a programmable circuit within a general use computer, 2) a sequence of computer implemented steps, operations, or procedures running on a specific-use programmable circuit; and/or 3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
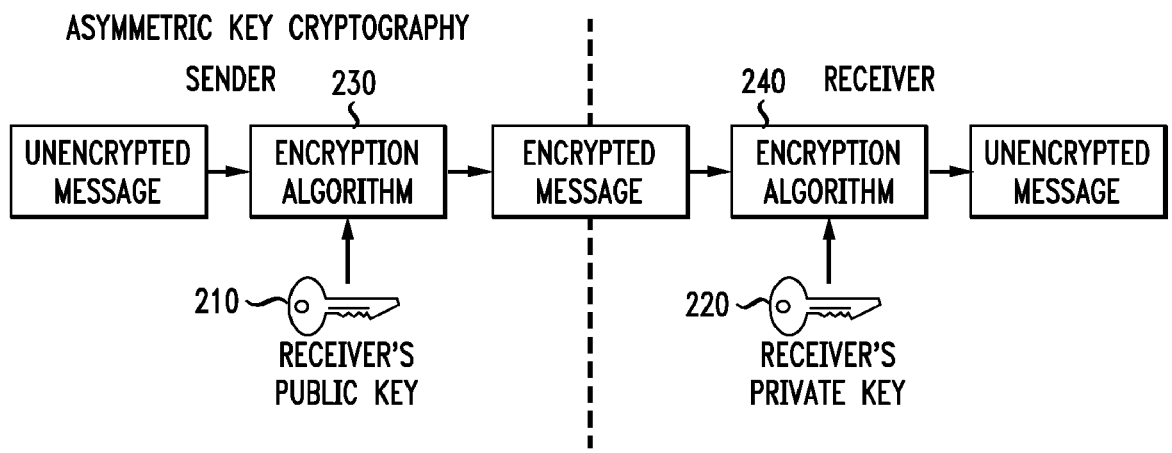
FIG. 2 illustrates an example of asymmetric key cryptography.
Figure 3:
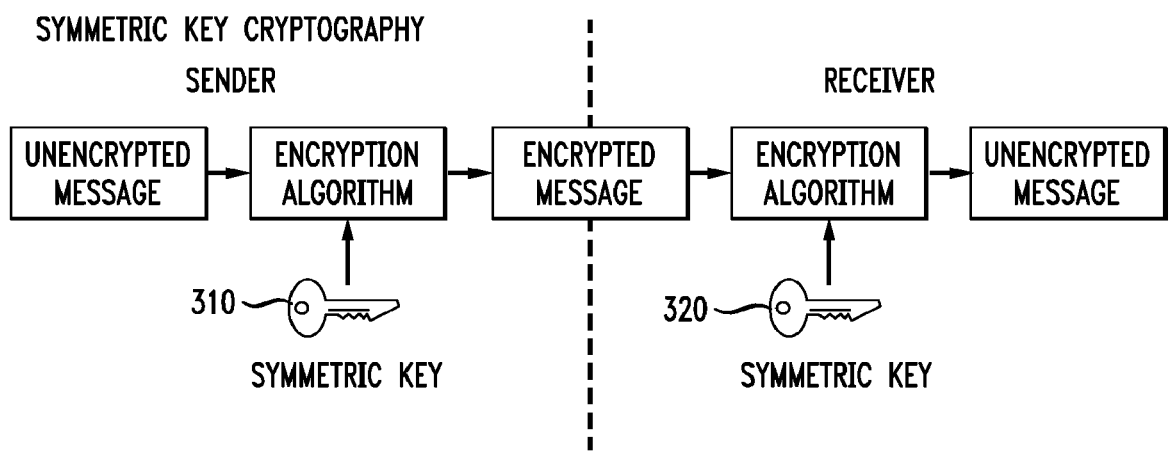
FIG. 3 illustrates an example of symmetric key cryptography.

Having disclosed an exemplary computing system, the disclosure now turns to a brief discussion of public-key cryptography. Public-key cryptography is a cryptographic approach that utilizes asymmetric key algorithms in addition to or in place of traditional symmetric key algorithms. FIG. 2 illustrates asymmetric key cryptography and FIG. 3 illustrates symmetric key cryptography. Asymmetric key algorithms differ from symmetric key algorithms in that different keys—public key 210 and private key 220—are used for encryption 230 and decryption 240, respectively. Symmetric key algorithms use the same key—symmetric key 310 and symmetric key 320—for encryption and decryption and are based on the notion of a shared secret key between the sender and the receiver of a message. Because public-key cryptography utilizes different keys for encryption and decryption, no secure exchange of a secret key between the sender and the receiver is needed.

In public-key cryptography, a mathematically related key pair is generated, a private key and a public key. Although the keys are related, it is impractical to derive one key based on the other. The private key is kept secret and the public key is published. A sender encrypts a message with the receiver's public key 210, and the receiver of the message decrypts it with the private key 220. Only the receiver's private key can decrypt the encrypted message.

Figure 4:
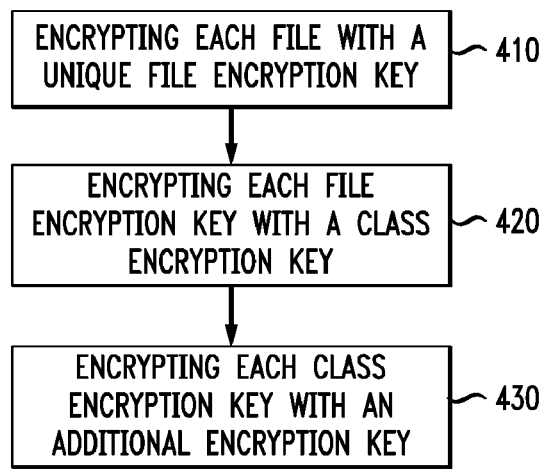
FIG. 4 illustrates an exemplary file-level content protection method embodiment.

Having disclosed some basic encryption-related concepts and system components, the disclosure now turns to the exemplary method embodiment shown in FIG. 4. For the sake of clarity, the method is discussed in terms of an exemplary system 100 such as is shown in FIG. 1 configured to practice the method.

FIG. 4 illustrates an exemplary file-level data protection method embodiment. The system 100 encrypts each file in a file system with a unique file encryption key (410), encrypts each file encryption key with a class encryption key (420), and encrypts each class encryption key with an additional encryption key (430). In one aspect, the class encryption key corresponds to the assigned protection class of the file. The protection class can allow for certain file behavior and access rights.

Once each file is encrypted with its own unique key, the system 100 can protect each one of those files with a secret known only to the user. When a file is created and individual file encryption key is generated, the system 100 can wrap that key with a class key. The unique file encryption key is metadata that the system 100 can store in the filesystem or which can exist in user space. The kernel can then cache the key during file access. By always encrypting a file and then wrapping its file key with a class key, the system 100 avoids the cost of encrypting every file already created when the user enables data protection. Instead, the system 100 simply encrypts the set of class keys, which is a bound and relatively inexpensive computational operation. With data protection enabled, if the user has not entered his passcode, then the class keys are not available. If the kernel cannot access the class keys, it cannot decrypt the individual file keys and the raw file data is inaccessible to the system. The efficacy of the feature now depends on how the class keys are managed.

When the device, such as a smartphone or personal computer, is locked, the system explicitly purges keys stored in memory as well as any data protected file contents stored in memory which should be inaccessible when the device is locked. For example, the system 100 can purge keys associated with protection classes A, B, C, but not class D when the device enters or is about to enter a locked state. The device can also purge or otherwise remove access to the contents of files stored in memory which are associated with classes A, B, C.

For example, protection classes can provide different functionality for different levels of authentication. The scenario set forth below illustrates one example application of protection classes. When a device that has data protection enabled first boots, the user has not yet entered his passcode. Thus none of the files are accessible because the class keys themselves are encrypted. Because the system relies on preference and configuration files that live on the data partition, the class keys must be decrypted before the files can be accessed. If those files cannot be read, then certain mission critical components are not able to boot to the point where the user can enter his passcode. One compromise is to separate the types of files that are accessible when the device has first booted from files that should only be accessible when the user has entered his passcode. The files can be separated into protection classes. Protection classes can include many aspects of policy for transformation, such as readability, writeability, exportability, and so forth. Some classes are associated with specific user actions, such as generating new keys without erasing the entire device when a user changes his or her password, for example.

One example protection class, known as Class A, is a basic class for data protected files. When the device first boots, Class A files are not accessible until the user enters his passcode. When the device is locked, these files become inaccessible. Some applications and/or system services may need to adapt to Class A because they cannot access their files when the device is locked, even if the application or system service is running in the background.

Another example protection class, known as Class B, is a specialized class for data protected files that require write access even when the device is locked. When the device first boots, Class B files are not accessible until the user enters his passcode. When the device is locked, these files can only be written to and not read. One example use for Class B files is for content downloaded while the device is locked, such as email messages, text messages, cached updates, a cache mail database for messages downloaded while the device is locked, and so forth. When the device is later unlocked, such files can be read. For example, when the device is later unlocked, the cache mail database can be reconciled with the primary mail database.

Another example protection class, known as Class C, is a specialized class for data protected files that require read/write access even when the device is locked. For example, when the device first boots, these files are not accessible until the user enters his passcode. When the device is locked, these files are still accessible. Class C files can be used for databases that need to be accessible while the device is locked. Some other example uses for Class C include data that can always be read once the device has been unlocked once after boot, even if it locks again, such as contacts and a calendar.

Yet another example protection class, known as Class D, is a default class for data protected files. Class D files are accessible regardless of whether the user has entered his passcode.

While four classes are discussed in detail herein, the number of protection classes can be more or less, such as 2 protection classes, 10 protection classes, or more and can include protection classes granting different access rights and performing different sets of functionality than what is discussed herein. Several additional exemplary protection classes follow. For example, one protection class can be a specialized class for files that are tied to a single device using the UID or keys derived from the UID and cannot be migrated to a second device. A second exemplary protection class can be a specialized class associated with a specific application. A third exemplary protection class can generate new keys whenever an escape from previous escrow is needed without the need to erase the whole device, for example a password change. The system 100 can change a passcode for every generation of a system key back, especially when blastable storage contains a key that wraps system key bags, such that former weak key bags (the original that has an empty passcode) become inaccessible on a passcode change.

In one aspect, when the system 100 changes states, such as going from locked to unlocked or vice versa, the system 100 erases certain class keys from memory. For example, if the device has been locked, it can erase the Class A key from memory and treat Class B as read only.

As operating systems are upgraded to use updated sets of classes having new keys and/or entirely new classes, the system 100 can store a new Class A key, for example. In this example, the system 100 uses the new Class A key for newly created files, while the system retains the older Class A key for dealing with older files. This can provide a protection class aware migration path for updating class keys in the event that they are cracked or more efficient algorithms or hardware are developed.

With respect to keychain backup items, the system can consider two dimensions. The first consideration is classes Ak, Ck, Dk and the second consideration is whether or not the keychain item is protected with the device UID, and thus cannot be transferred to other devices. If the keychain is protected with the device UID, it can only be restored to the same device it was backed up from. Those classes are known as Aku, Cku, Dku. The additional "u" state is used for backup protection to indicate if it can be transferred to a different device. For example, if "u", than it cannot be restored to a different device. The class (A, C, D) is used at runtime on the device the same, regardless of the "u" state. If the system includes additional classes, the second dimension (whether or not it is also wrapped with the UID and can or cannot be restored to a different device) would also apply to the additional key classes.

Figure 5:
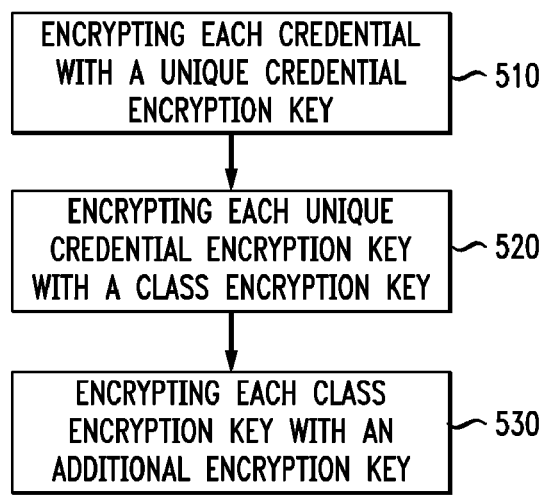
FIG. 5 illustrates an exemplary credential keychain protection method embodiment.

In one embodiment, the system 100 encrypts a credential keychain. FIG. 5 illustrates a system performing credential keychain data protection. A credential keychain is a file, set of files or database that contains credentials. A credential can include a password, username, or encryption key, for example. The system 100 encrypts at least a subset of credentials with a unique credential encryption key (510), encrypts each unique credential encryption key with a class encryption key (520), and encrypts each class credential encryption key with an additional encryption key (530). The class encryption key corresponds to the assigned protection class of the file, wherein the protection class allows certain file behavior and access rights. Credential protection classes can be based on all or part of the protection classes set forth above.

Figure 6:
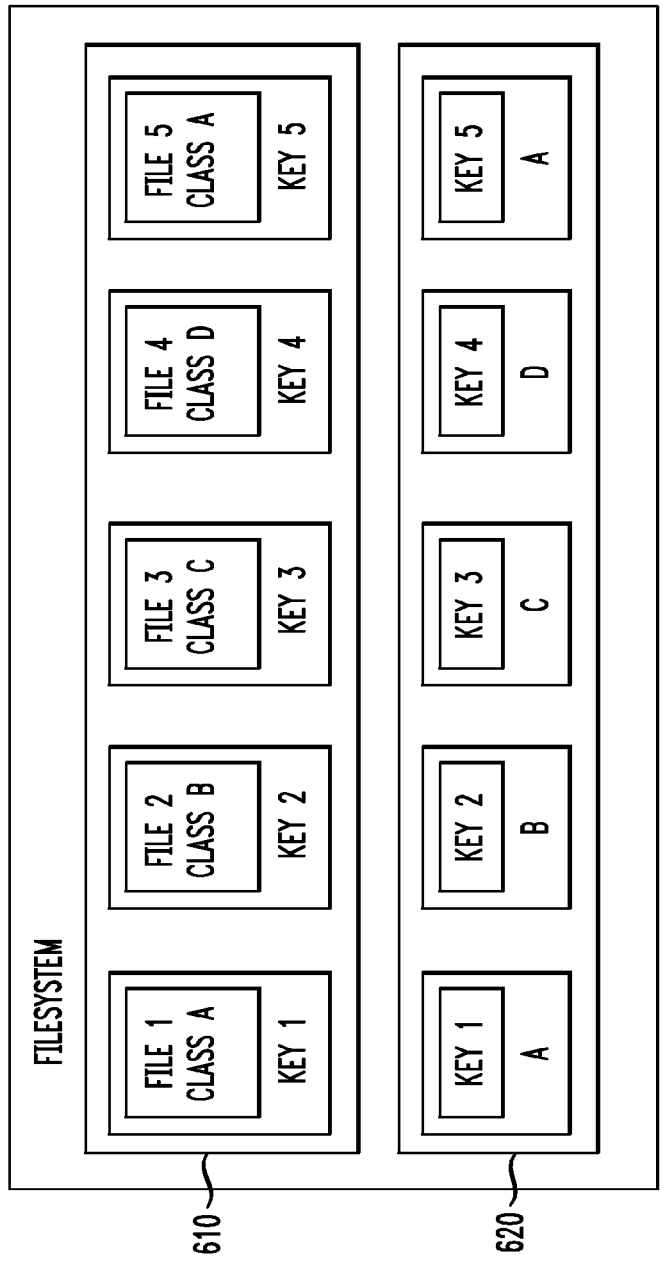
FIG. 6 illustrates an exemplary file system encrypted on a per file basis using class keys.

FIG. 6 illustrates an exemplary file system using file-level data protection which encrypts on a per file and per class basis. It can also illustrate an exemplary credential keychain using data protection. The system assigns each respective file or credential to one of a set of protection classes 610, and assigns each protection class a class encryption key. In one aspect, each class encryption key is unique. The system encrypts each file encryption key with the corresponding class encryption key 620. For example, File 1 and File 5 are part of protection Class A, but have unique encryption keys. File 1 is encrypted with Key 1, while File 5 is encrypted with key 5. Both key 1 and 5 are encrypted with key A. The protection classes allow certain file behavior and access rights. This tiered approach to file or credential access through protection classes allows the system to protect files differently depending on the desired level of security.

The system 100 encrypts the class encryption keys based on a combination of one or more of a user passcode, a public encryption key and a unique device specific code depending on the type of key bag in which the keys are stored. Key bags are a set of keys accessible to the system, such as an operating system kernel. In one variation, each key bag encrypts individual class keys in a unique way based, for example, on a unique combination of the user passcode, the public encryption key, and the unique device specific code. One key bag encrypts class keys based on the user passcode and the unique device specific code, another key bag encrypts class keys based just on the unique device specific code, and yet another key bag encrypts class keys based on all three, for example. The system 100 stores class encryption keys in key bags, such as a default key bag, a protected key bag, an escrow key bag, and a backup key bag.

In one embodiment, the key bags are accessible in user space, but their contents can only be accessed in kernel space by a special kernel extension. A daemon in user space can provide the kernel with the proper key bag and the information necessary to access its contents. Further, backup and sync components on the host generally need to coordinate with the device in order to make data accessible while the device is locked. This coordination can be handled by a lockdown service agent that proxies their requests to a management daemon, which in turn coordinates with the kernel extension.

The system 100 uses the different key bags for different purposes. For example, the backup key bag and/or the escrow key bag can be used in backing up a device or synchronizing devices. A default key bag can protect the device in its initial state before a user enables data protection such as by creating a passcode. In one aspect, the backup key bag is never kept on the device. The backup key bag is part of the backup, and is used to encrypt the files in the actual backup, not any files on the device. When restoring to a device, the backup key bag is sent over, so the restored files from the backup can be decrypted.

In another variation, the escrow key bag is kept on the device, but it can't be used by the device without a secret that is only kept on the backup host. The escrow key bag is used to access files/keychain items on the device so they can be backed up, even if the device is locked where they normally could not be accessed. The backup host can be a computer, another mobile device, a server or collection of servers, a web service, or just a drive. Such a drive, for example, can require some credential from the device to gain access, but once the device can access it, the backup is just stored on the drive which is not an active agent.

Regardless of the type of backup device type, the backed up files do not have to be encrypted with the same file keys as the ones on the device. In one embodiment, the backup device transfers the files as is (with the same encryption), and encrypts the file keys themselves with the backup key bag's class keys. In another embodiment, the files are actually transcrypted (converted from one encryption scheme or key to another encryption scheme or key) using a file key that is different and distinct from the file key used on the device.

Figure 7:
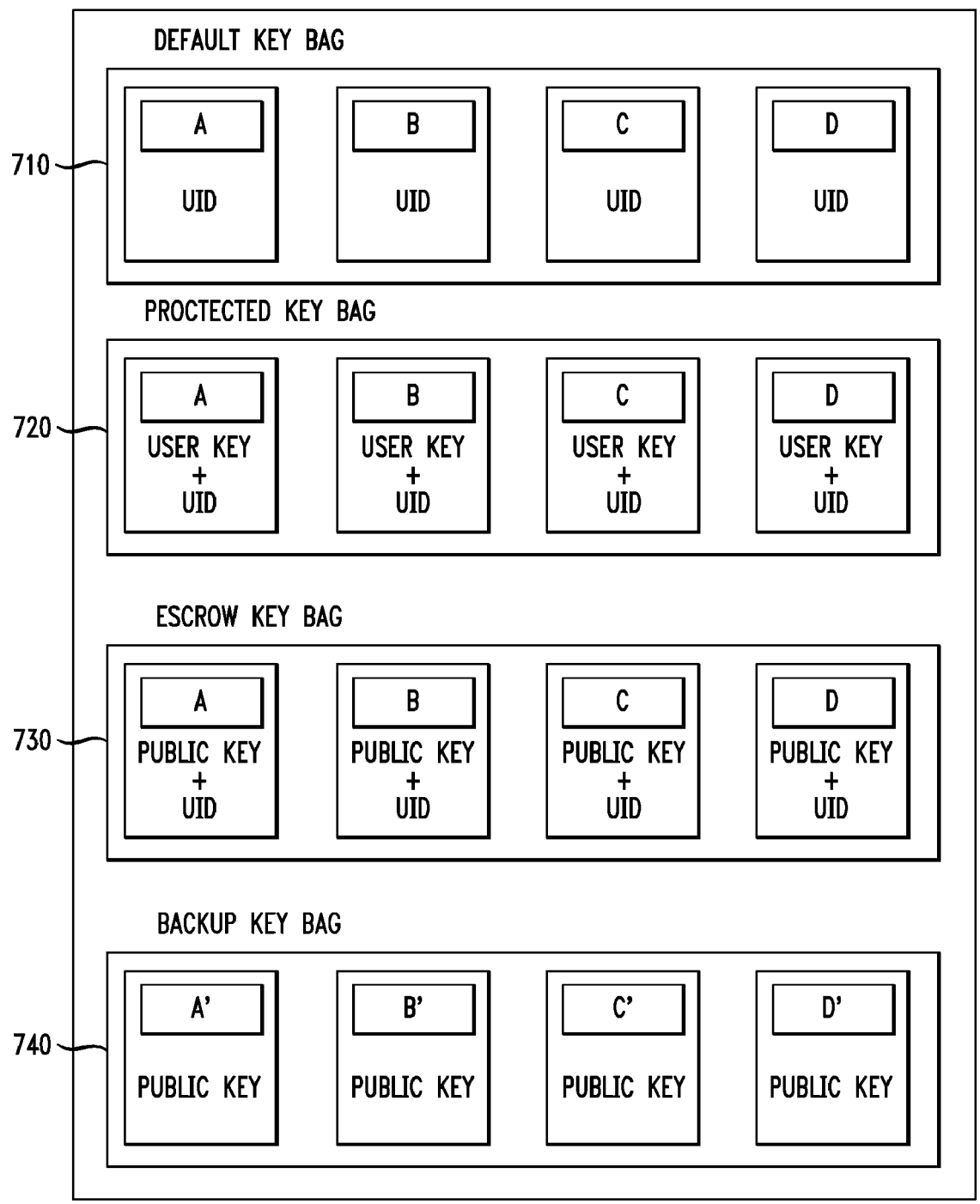
FIG. 7 illustrates an exemplary set of key bags.

FIG. 7 illustrates an exemplary set of key bags on a device with file-level data protection. The default key bag 710 contains all class encryption keys encrypted by the unique device specific code. The unique device specific code is the only key available to the hardware, while keys derived from the unique device specific code are available in memory. The system 100 utilizes the default key bag on a device that does not have data protection enabled. In one variation, the default state of the device is to operate with data protection disabled; the user must enable data protection. In one aspect, the user automatically enables data protection by creating a passcode. The system 100 uses the passcode to protect the class encryption keys in the protected key bag. When a user changes his password, the key that protects system key bags is changed. Key bags protected by the former password become inaccessible on a passcode change.

The protected key bag 720 contains all class encryption keys encrypted by the user key and the unique device specific code. The user key can be the same as the user passcode or can be derived from the user passcode. The user key is an encryption key based on the user passcode. When the user enables data protection, such as by creating a passcode, the system 100 converts the user's passcode into a derived secret that can be used to protect the protection class keys. A new key bag, the protected key bag, is generated that contains the protection class keys encrypted by the user key and the unique device specific code.

In one aspect, when a user locks his device or the device automatically places itself in a locked state, the system 100 can grant certain applications a grace period to finalize their data and write it to mass storage before enforcing the class encryption keys for a locked state. For example, if a user is composing an email on a mobile device and leaves mid-composition, the mobile device can automatically lock after a timeout duration. After the mobile device is locked, the system can grant the email application a grace period and/or notify the email application of the grace period duration so that the email application can save the half composed email as a draft despite the mobile device's locked state, for example.

A third key bag 730, the escrow key bag, contains all class encryption keys encrypted by the unique device specific code and a public key 210 relating to an asymmetric key pair. The system 100 utilizes the escrow key bag 730 during synchronization and/or backup operations. Lastly, the backup key bag 740 contains all class encryption keys encrypted by the public key. The system uses the backup key bag 740 during a backup event. It is important to note that the backup key bag 740 contains different class encryption keys than the default, protected and escrow key bags 710, 720, 730. In one variation, the backup and escrow key bags 730, 740 are protected by the public key generated by the device, not the user passcode. Because it may be impractical for a user to enter a passcode each time the system 100 performs a backup or synchronization, the system 100 can protect the protection class keys with a key that does not relate to the user passcode. The backup host can store the backup key bag.

Because the default key bag is not protected by a user passcode, the device is vulnerable to attack. For example, if an attacker steals the device and executes malicious computer code on it, he can access the device specific code and decrypt all class keys. Sensitive user data is no longer protected once an attacker decrypts the class keys because the attacker can decrypt all file encryption keys. The attacker can then decrypt files with the file encryption keys, accessing sensitive user information. As stated above, one initial state of the device is to protect class keys using the default key bag. When file-level data protection for the device is enabled, the system 100 uses the public encryption key to protect the protected, escrow and backup key bags.

In one aspect, each class key is randomly generated. In another aspect, class keys in the default key bag are wrapped with the device's unique device identifier (known as a UID or UDID), which is a unique code associated with the hardware of the device. The UID is only accessible when the device is running in a secure environment and cannot be used by any other device. It should be noted that if the device is cracked such that the attacker can control the kernel, he can decrypt items protected with the UID. This is why one aspect of this disclosure is to also protect key bags with a secret known only to the user.

Figure 8:
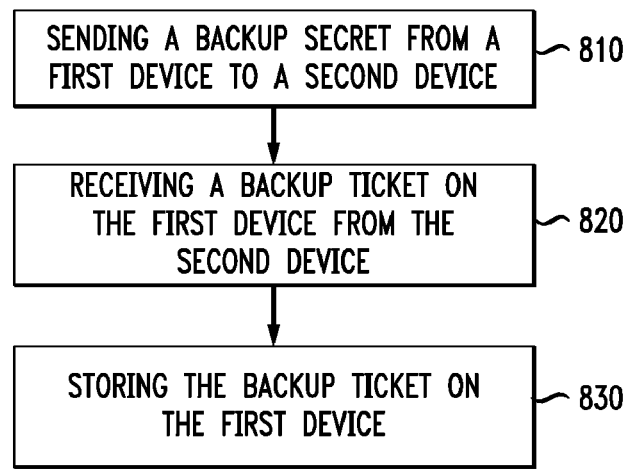
FIG. 8 illustrates a first exemplary backup initiation method embodiment for a host device.

Having discussed different protections for class encryption keys, the disclosure now turns to the issue of backing up data from a device having file-level data protection. FIG. 8 illustrates an exemplary backup initiation method from a first device to a second device having file-level data protection from the perspective of the host device that backs up data from a client device. Before a backup can occur, the first and second devices must initially establish a relationship. As part of the initial establishment of the relationship, the first device sends a backup secret to a second device (810), receives a backup ticket containing encryption keys from the second device (820) and stores the backup ticket on the first device for later use in a backup event (830). In one aspect, the first and second devices are different, such as a mobile device and a desktop computer. The devices can also be, for example, a laptop backing up to a network-based backup service. The first and second devices can be any pair of computing devices, at least one of which has a file system that is at least partially encrypted using file-level data protection. In one implementation, the backup secret and backup ticket are stored separately. For example, the secret is chosen and stored on the client device and the backup ticket is stored on the host device.

Figure 9:
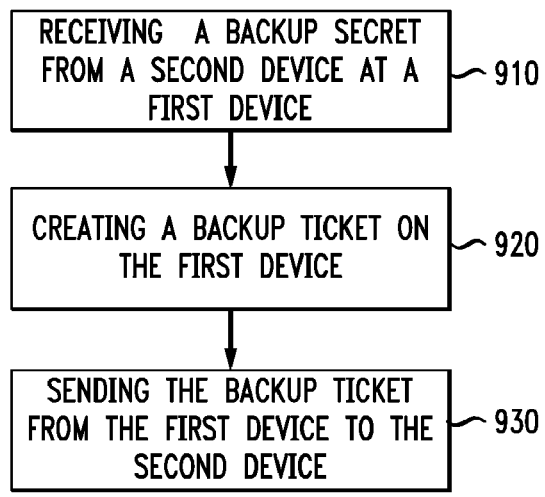
FIG. 9 illustrates a second exemplary backup initiation method embodiment for a client device.
Figure 10:
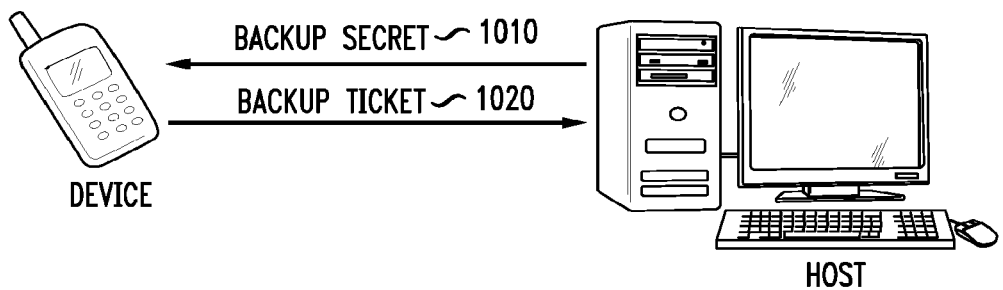
FIG. 10 illustrates an exemplary backup initiation system configuration.

FIG. 9 illustrates a second exemplary backup initiation method embodiment from the perspective of a client device to be backed up by a host device and FIG. 10 illustrates an exemplary backup initiation system configuration. The first device receives a backup secret 1010 from a second device (910), creates a backup ticket 1020 containing encryption keys (920) and sends the backup ticket 1020 from the first device to the second device (930) for later use in a backup event. In one aspect, the device places itself in a lockdown state or the host instructs the device to place itself in a lockdown state. A lockdown state can include suspending file operations, wireless transfers, file system reads and/or writes, user input, and so forth. Such a lockdown state allows the data on the device to be backed up correctly and without interference or data corruption. Multiple lockdown states can exist which can apply to different hardware or software components and can apply different levels of lockdown. For instance, one level of lockdown can allow read access to stored data but disallow write access for the duration of the backup process. In one lockdown state, user data is locked down but not operating system files. Other variations exist and can be tailored to specific use cases or backup strategies.

Figure 11:
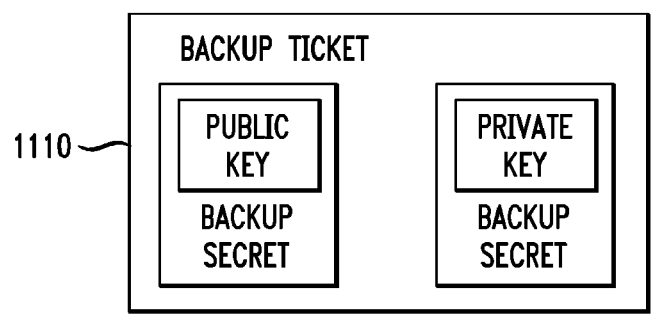
FIG. 11 illustrates an example backup ticket.

FIG. 11 illustrates an example backup ticket 1110. In one variation, the backup ticket 1110 includes a first backup secret encrypting the public key, and a second backup secret encrypting the corresponding private key. The first device creates the backup ticket by encrypting an asymmetric encryption key pair containing a public key and a private key with the backup secret provided by the second device. The system 100 must decrypt the public key and the private key with the backup secret before using them in a backup event.

Figure 12:
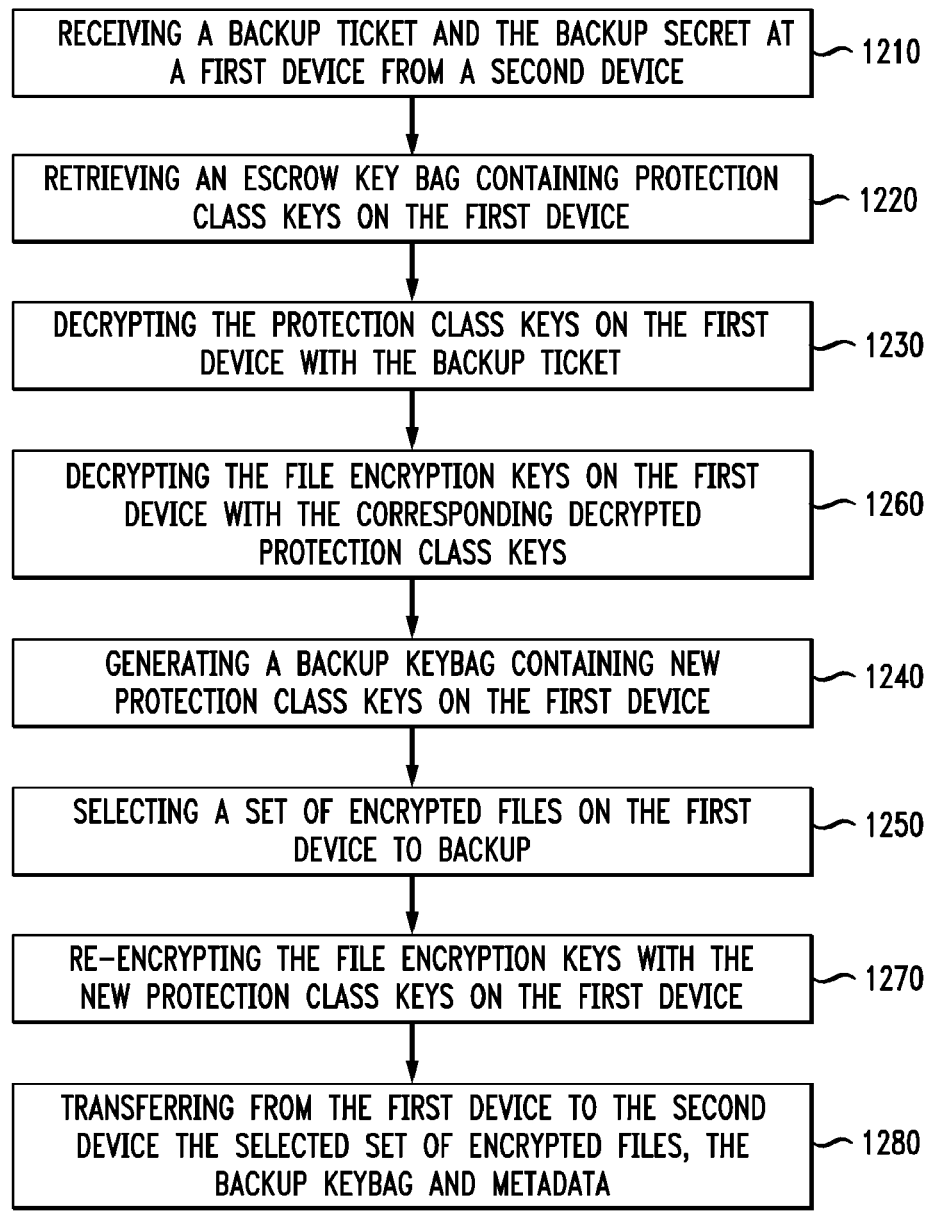
FIG. 12 illustrates a first exemplary backup method embodiment for a client device.

FIG. 12 illustrates a first exemplary backup method embodiment from the perspective of a client device having file-level data protection. The first device receives a backup ticket containing encryption keys encrypted with a backup secret, and the backup secret from a second device (1210), and retrieves an escrow key bag on the first device (1220). The escrow key bag contains protection class keys for the protection classes encrypted with the public key and the unique device specific code. In one aspect, part of the escrow key bag is stored on the first device and part is stored on the second device. The second device can then combine the locally stored portion of the escrow key bag with the retrieved portion of the escrow key bag received from the first device to reconstitute the escrow key bag. The first device decrypts the protection class keys with the backup ticket (1230) and generates a backup key bag containing new protection class keys (1240). The system generates a backup key bag containing new protection class keys because the system sends the backup key bag to a backup device.

For security reasons, the original protection class keys never leave the device. Instead, this approach rewraps the individual files with a new set of class keys. When the host sends the backup ticket to the device in order to access the original device class keys in the escrow key bag, the system can establish a new set of backup class keys. For enterprise users or other uses, the system can provide an option to disallow the new set of class keys from being backed up. This can allow users to support a zero knowledge backup of the device to a host.

Once the system generates the backup key bag, the first device either automatically selects or selects based on user input a set of encrypted files to back up (1250). The system 100 decrypts the file encryption keys corresponding to the selected set of encrypted files. The system decrypts the file encryption keys with the corresponding decrypted protection class keys (1260) from the escrow key bag. The system 100 re-encrypts the file encryption keys corresponding to the selected set of encrypted files with the new protection class keys (1270). In one aspect, the system directly accesses encrypted data from the filesystem instead of decrypting and re-encrypting the file encryption keys.

Once the system 100 re-encrypts the file encryption keys, they are ready for transfer to the backup device. The first device transfers to the second device the selected set of encrypted files, the backup key bag and metadata associated with the selected set of encrypted files (1280), including the file encryption keys. It is important to note that the system stores the backup files along with the backup key bag, backup ticket and backup secret on the backup device. Since the backup secret decrypts the backup ticket, and the backup ticket decrypts the backup key bag, the class protection keys are accessible. If the class protection keys are accessible, then the backup file keys are accessible, and the backup files can be decrypted. Since the backup class protection keys differ from the class protection keys stored in the default, protected and escrow key bags on a device, an attacker that accesses backup keys can only decrypt backup files on the second device; he cannot access files on the first device. This approach can limit the potential avenues an attacker can take to compromise sensitive user data on a device.

FIG. 13 illustrates a second exemplary backup method embodiment from the perspective of a host device that backs up encrypted data from a client device and FIG. 14 illustrates an exemplary backup system configuration. FIGS. 13 and 14 are discussed together below. The second device sends a backup ticket containing encryption keys encrypted with a backup secret, the backup secret 1410 and a host identifier to the first device (1310) and receives the selected set of encrypted files, the backup key bag and metadata 1420 associated with the selected set of encrypted files from the first device (1320), including the file encryption keys.

Having disclosed backup initiation and the backup process on a system with file-level data protection, the disclosure now turns to restoring encrypted backup files to a device with file-level data protection. In one aspect, encrypted backup files can be restored to a device not capable or not configured to encrypt on a per-file and per-class basis. In this case, the restored backup files can retain their respective unique file keys and class keys which can be activated when the files are restored to a device capable of such encryption.

In one backup variation, the host connects on the device to establish a backup relationship. The host generates a backup secret. If the user has chosen to protect his backups with a password, the secret can be derived from this password. If not, the secret can be generated at random and stored on the host. The host sends this backup secret to the device. The device creates a host identity if one does not already exist, and provides it with the backup secret as well. The host constructs the backup ticket based on a host identity and/or the backup secret and transmits it to the device. Unlike a sync ticket, the two elements of the host identity are not encrypted with the device UID, but instead are encrypted with the backup secret. As a result, if the user has chosen to protect his backups with a password, any backup content associated with that backup ticket is essentially tied to the user's password. The host can store a key that can access files backed up from the device. This means that an attacker could access data from a device if he has stolen or compromised the host. In some systems, availability of secure storage mitigates this risk, but other systems, such as Microsoft Windows®, options for such secure storage are limited.

Figure 15:
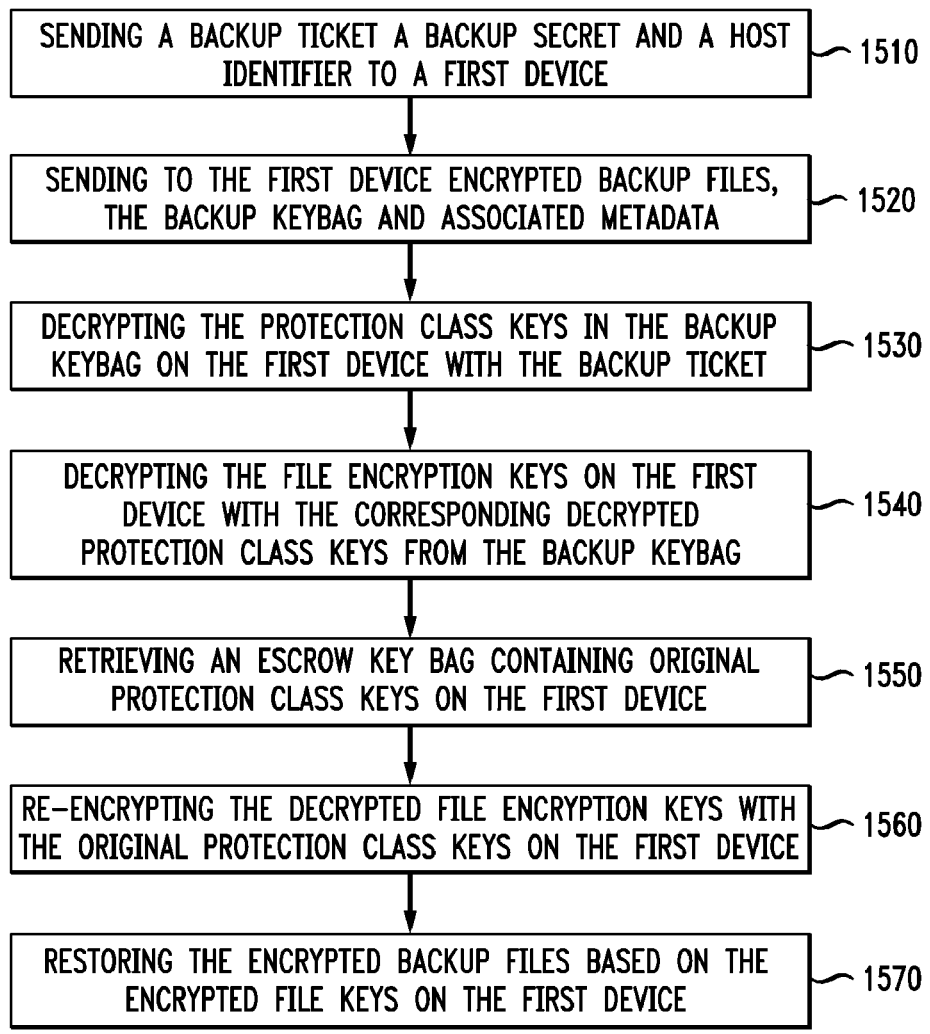
FIG. 15 illustrates a first exemplary encrypted backup file restoration method embodiment for a host device.

FIG. 15 illustrates a first exemplary encrypted backup file restoration method embodiment from the point of view of a host device. The system 100 sends a backup ticket, a backup secret, and a host identifier to a first device having a file system encrypted on a per file and on a per class basis (1510) and sends to the first device encrypted backup files, the backup key bag, and associated metadata including encrypted file keys (1520). Since the protection class keys protecting the encrypted file keys in the backup key bag differ from those in the default, protected and escrow key bags, the first device must re-encrypt the file keys with the original class keys stored on the device. The first device decrypts the protection class keys in the backup key bag with the backup ticket (1530) and decrypts the file encryption keys with the corresponding decrypted protection class keys from the backup key bag (1540). Once the system decrypts the backup protection class keys and the file encryption keys, the first device retrieves an escrow key bag containing original protection class keys (1550), re-encrypts the decrypted file encryption keys with the original protection class keys (1560) and restores the encrypted backup files on the first device (1570).

Figure 16:
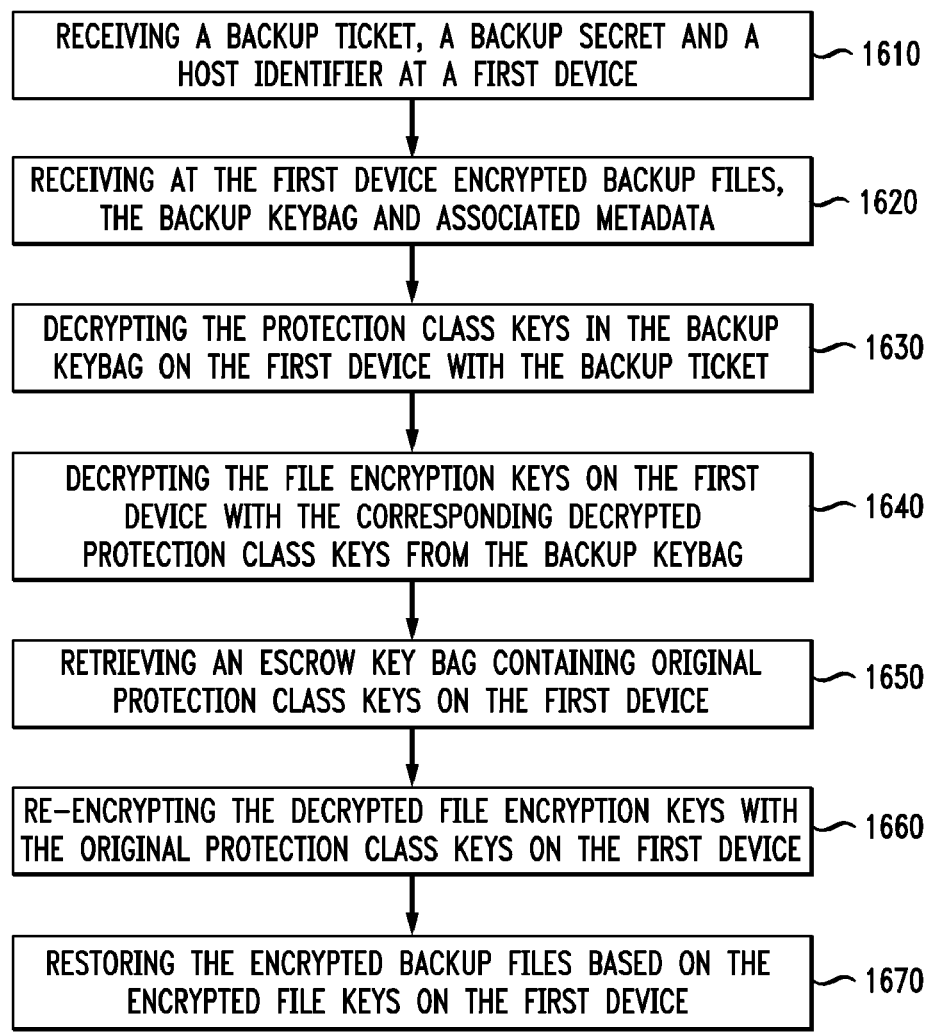
FIG. 16 illustrates a second exemplary encrypted backup file restoration method embodiment for a client device.
Figure 17:
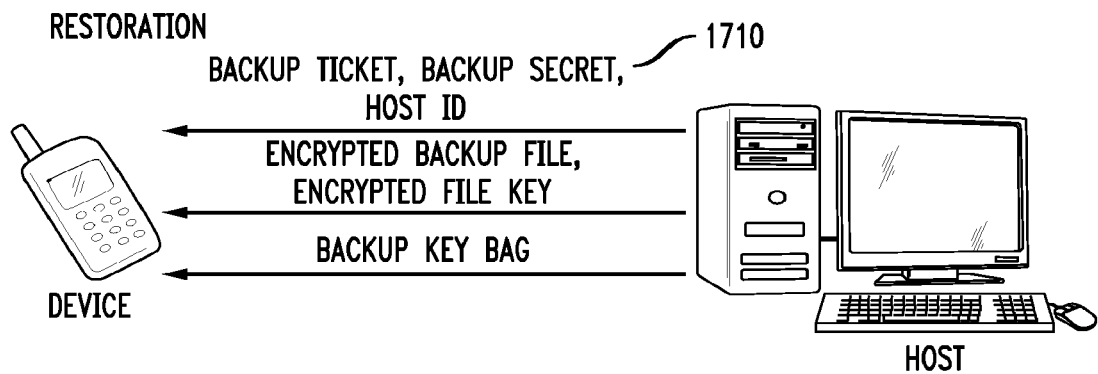
FIG. 17 illustrates an exemplary encrypted backup file restoration file system configuration.

FIG. 16 illustrates a second exemplary encrypted backup file restoration method embodiment for a client device and FIG. 17 an exemplary encrypted backup file restoration file system configuration. FIGS. 16 and 17 are discussed together below. The system 100 receives a backup ticket, a backup secret, and a host identifier at a first device (1610). The system also receives encrypted backup files, the backup key bag and associated metadata 1710 including encrypted file keys (1620) at the first device. The system decrypts the protection class keys in the backup key bag with the backup ticket (1630) and decrypts the file encryption keys with the corresponding decrypted protection class keys from the backup key bag (1640) on the first device. Once the device decrypts the protection class keys and the file encryption keys, the first device retrieves an escrow key bag containing original protection class keys (1650), re-encrypts the decrypted file encryption keys with the original protection class keys (1660), and restores the encrypted backup files based on the re-encrypted file keys on the first device (1670).

The disclosure now turns to a discussion of restoring a backup. The system 100 can restore a backup to the same device that was the original source for the backup data or to another device. In either case, the backup is based on the backup key bag. One example of this scenario is backing up a mobile phone to a desktop computer and restoring the backed up data to the mobile phone, such as after a system erase and reinstall. When the host wants to restore a backup to the device, it needs to do two things. First, the host unlocks the device class keys, and also provides the device with the backup class keys so that restored files can be re-wrapped with the device class keys. The host can provide the backup ticket and backup secret to unlock the escrow key bag as before. When the backup agent on the device restores a file from the host, it will need to rewrap the file encryption key with the original device class key. It receives the file's metadata from the host which includes the wrapped file key. The system unwraps the wrapped key and decrypts the file key using the appropriate backup class key, and then encrypts it with the appropriate device class key.

The backup agent then sets the metadata of the file with the rewrapped file key. If the backup agent is restoring files from multiple backup repositories, such as files that were backed up during an incremental backup, the host is responsible for sending the appropriate backup key bag to the device. In one aspect, the system can only load one backup key bag at a time. This requires a certain level of coordination between the backup component on the host and the agent on the device so that the rewrapping operation does not fail or result in a corrupted file key.

The disclosure now turns to a discussion of restoring a backup to a different device with the backup key bag. One example of this scenario is backing up a mobile device to a desktop computer and restoring the backed up data to a replacement device after the mobile device is lost, stolen, or destroyed. Restoring to a different device follows the exact same mechanism as restoring to the original device with one important distinction: files that are associated with a protection class based on a device-specific identifier or UID. Files associated with a UID are protected with the UID of the new device. One example of this is when a device enrolls with a Virtual Private Network (VPN) server, the device is granted credentials that were only intended for that device, and should not be allowed to be migrate to another device, even in the event the original device was lost.

Having discussed the process of backing up a device with file-level data protection, the disclosure now turns to the issue of synchronizing devices with file-level data protection.

Figure 18:
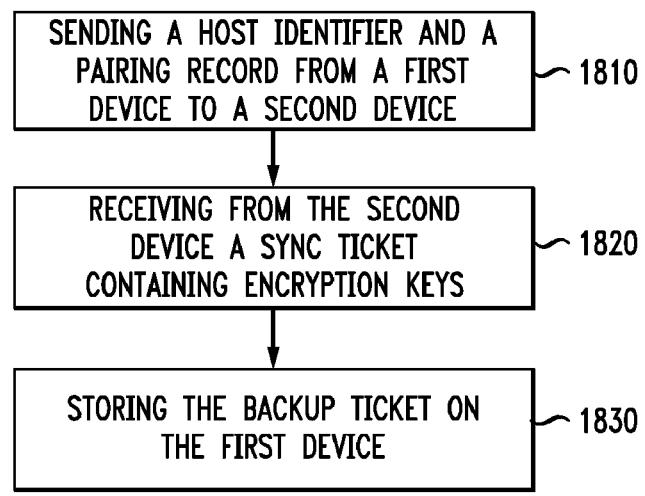
FIG. 18 illustrates a first exemplary data synchronization initialization method embodiment for a host device.
Figure 19:
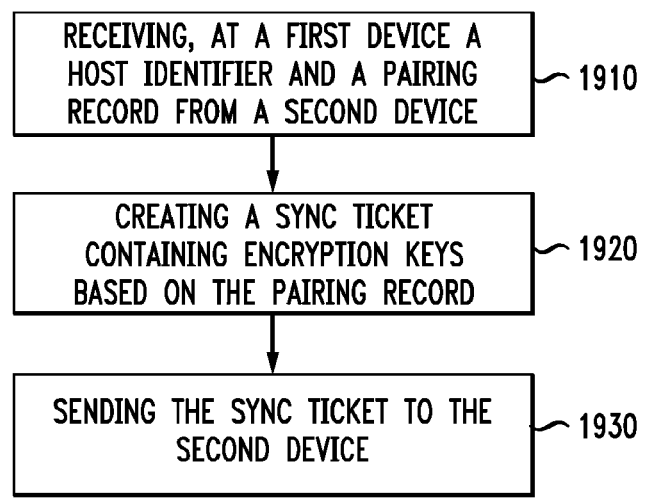
FIG. 19 illustrates a second exemplary data synchronization initialization method embodiment for a client device.

FIG. 18 illustrates a first exemplary data synchronization initialization method embodiment for a host device. A first device sends a host identifier and a pairing record to a second device having file-level data protection (1810). A pairing record can include a unique identifier for the host which is known as the Host ID. The first device then receives from the second device a sync ticket containing encryption keys (1820) and stores the sync ticket on the first device (1830). The sync ticket contains encryption keys that protect the protection class keys. FIG. 19 illustrates a second exemplary data synchronization initialization method embodiment for a client device which is complementary to the exemplary method illustrated in FIG. 18. The system 100 receives at a first device a host identifier and a paring record from a second device (1910). The system 100 creates a sync ticket containing encryption keys based on the pairing record (1920). The system 100 then sends the sync ticket to the second device.

Figure 20:
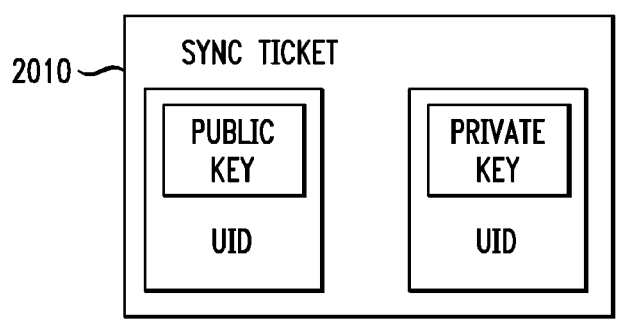
FIG. 20 illustrates an example sync ticket.

FIG. 20 illustrates an example sync ticket. The sync ticket 2010 encrypts a public key and a corresponding private key with the UID or device-specific code. The device to be synced creates the sync ticket by encrypting an asymmetric encryption key pair containing a public key and a private key with the host identifier and pairing record provided by the second device. The system 100 must decrypt the public key and the private key in the sync ticket before it can use them in a synchronization event.

Figure 21:
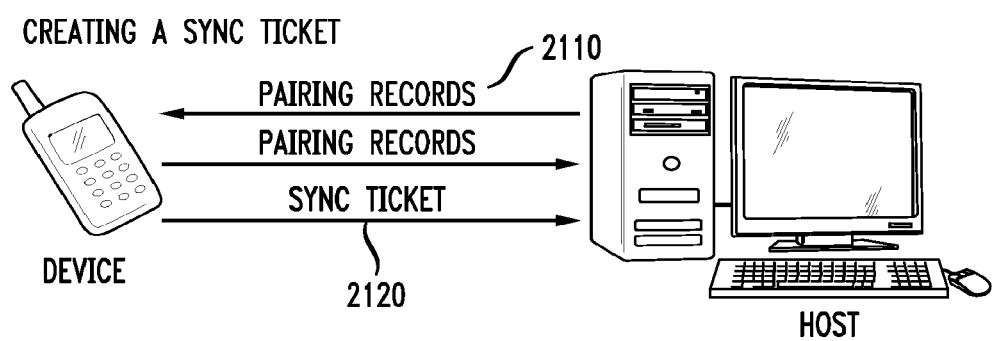
FIG. 21 illustrates an exemplary data synchronization initialization system configuration.

FIG. 21 illustrates a system initiating data synchronization. A first device having a file system encrypted on a per file and on a per class basis receives 2110 a host identifier and a pairing record from a second device (1910), creates a sync ticket 2010 containing encryption keys (1920) and sends 2120 the sync ticket to the second device (1930).

Figure 22:
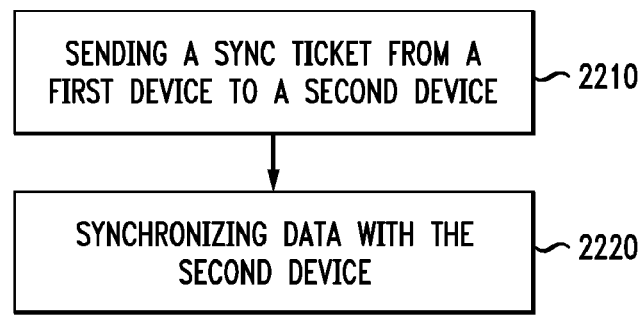
FIG. 22 illustrates a first exemplary data synchronization method embodiment for a host device.
Figure 23:
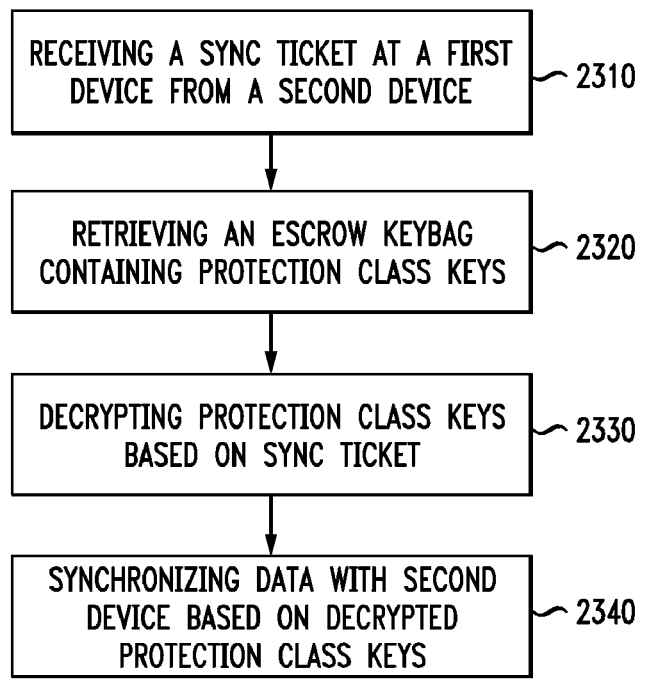
FIG. 23 illustrates a second exemplary data synchronization method embodiment for a client device.

FIG. 22 a first exemplary data synchronization method embodiment for a host device. A first device sends a stored sync ticket to the second device having file-level data protection (2210) and synchronizes data with the second device based on at least one of the stored sync ticket and the decrypted protection class keys (2220). FIG. 23 illustrates a second exemplary data synchronization method embodiment from the perspective of a client device. A first device having file-level data protection receives a sync ticket containing encryption keys from a second device (2310) and retrieves an escrow key bag containing protection class keys (2320). An escrow key bag can be used to unlock a device during sync without the need for a user to enter a passcode. The separate secret is stored on host and device. This approach differs from the approach used with a system key bag, in that the escrow key bag is protected by moving the secret off device. Escrow bags can be stored on a mobile device management server, for example, and used to reset the device from the mobile device management server.

The first device decrypts protection class keys based on the sync ticket (2330). The system decrypts the sync ticket with the unique device specific code stored on the device and decrypts the protection class keys stored in the escrow key bag with the private key stored on the sync ticket. Once the system decrypts the protection class keys, the system can decrypt the file keys, and decrypt the files using the decrypted file keys. Once the system decrypts the files, the system can synchronize data with the second device (2340). This process allows for new keys created between sync events to be escrowed by storing the public key of the sync ticket on the device. Additionally, the synced device may revoke access by removing escrowed keys from the device.

Having discussed synchronizing data between devices having file-level data protection, the disclosure now turns to the issue of obliteration. Obliteration is used to destroy or remove access to data on a device. In one aspect, obliteration can include actually erasing data stored on a device. In another aspect, obliteration does not actually erase data stored on a device, but removes the means for decrypting encrypted data, thereby effectively erasing data stored on the device by removing access to the data in its usable clear form. In one implementation, a NAND flash layer includes an effaceable storage component which is utilized to guarantee a key is deleted from the system during obliteration or a password change. NAND flash is a type of non-volatile computer storage.

Figure 24:
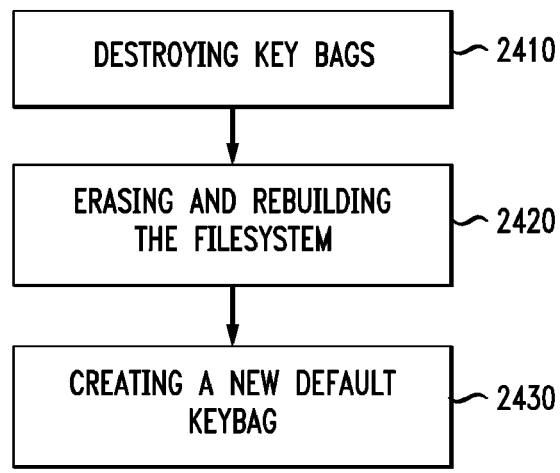
FIG. 24 illustrates an exemplary obliteration method embodiment.

FIG. 24 illustrates one exemplary method embodiment outlining the process of obliteration. During the obliteration process a device with file-level data protection destroys all key bags stored on the device (2410), such as keys or key bags stored in memory and key bags stored on mass storage such as a hard disk drive or solid-state drive. The system 100 erases and rebuilds the file system (2420) and creates a new default key bag (2430). The device 100 can then reboot to complete the obliteration process. In one aspect, the system 100 can perform obliteration of another device or cause the device to perform obliteration on itself, based on user input for example. In another aspect, the system 100 is a server that instructs, via a set of wireless signals such as cellular telephone signals or wifi signals, a remote device to perform obliteration on itself. A device can send a confirmation to the server that verifies that the obliteration instructions were successfully executed on the remote device. The device can send to the server incremental confirmations of each step in the obliteration process. One such scenario for this approach is erasing a lost or stolen device containing confidential or sensitive information when the device is still reachable via a wireless network.

When the system creates a new default key bag, it generates a new set of protection class keys and stores them in the default key bag. After the system obliterates the device, the device does not contain sensitive user information or does not have any way of accessing, understanding, or decrypting sensitive user information. Obliteration can be useful when a device is refurbished for use by a different user.

In the variations discussed above, the device and host, whether backup host or synchronization host, store different key bags. In one suitable configuration, the various key bags are stored as follows: the device stores the backup key bag secret and the escrow key bag secret. The host stores the backup key bag and the escrow key bag. The host can optionally store the backup key bag secret.

Having discussed synchronizing data between devices having file-level data protection, the disclosure now turns to the issue of passcode verification. Typically, a device stores a user passcode or some derivation of a user passcode, for example a hash. A hash is a mathematical function that accepts a value as input and outputs a hash value. Often, the hash value is used as an array index. In the case when a device stores a passcode, the device compares an entered passcode with the stored passcode on the device. If the passcodes match, a user is granted access. In the case when a device stores a passcode hash, the device compares a hash of the entered passcode with the hash stored on the device. If the hash values match, the user is granted access. A device with file-level data protection does not store the passcode or any derivation of the passcode on the device. For password verification, the device checks an entered passcode by attempting to decrypt data encrypted with the passcode.

Figure 25:
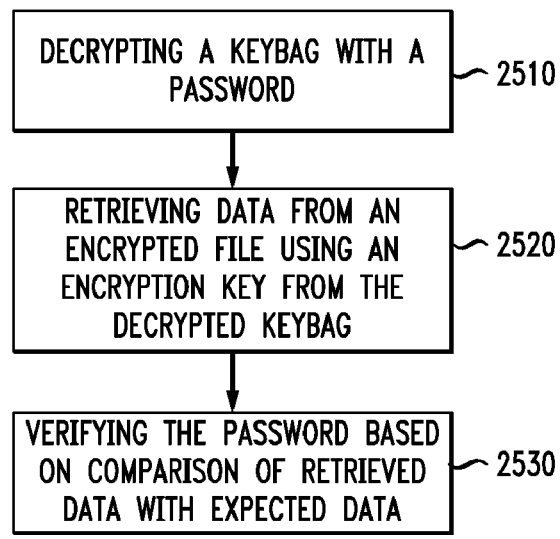
FIG. 25 illustrates an exemplary password verification method embodiment.

FIG. 25 illustrates an exemplary method for password verification on a device having file-level data protection of at least a portion of its file system. A system 100 practicing the method decrypts, based on a password, the class keys stored in the protected key bag with the passcode (2510). The system 100 retrieves data from one or more encrypted files using an encryption key from the decrypted key bag (2520). If the files decrypt correctly or match the decrypted data matches expected data, the entered passcode is valid (2530). If the files do not decrypt correctly, the entered passcode is considered invalid and access is denied. In one aspect, the system 100 can "preheat" the profiled process that checks if a passcode is required to unlock the device (and to act as the go between for the UI to validate the passcode) when waking up the device, to avoid delays for the user. Preheating can include one or more of loading the profiled process into memory first when waking up the device, keeping the profiled process stored in memory even when in a locked or sleeping state, and/or other optimization approaches.

In one modification, the system performs garbage collection on keys to be deprecated. The system can perform the garbage collection by comparing a list of referenced counted class keys with a list of class keys used in the file system, and removing keys which are not referenced or otherwise used. The system can also gradually or incrementally transform wrapping keys when new keys are generated to protect new content.

The principles described herein can be applied in conjunction with other compatible encryption approaches.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. The principles herein primarily discuss mobile devices, but can be equally applied to any computing device. For example, a portable mass storage device can apply any or all of these approaches via its controller board when it interfaces with a laptop or desktop computer. Those skilled in the art will readily recognize various modifications and changes that may be made to the principles described herein without following the example embodiments and applications illustrated and described herein, and without departing from the spirit and scope of the disclosure.

What is claimed is:

1. A method for controlling access to a computing device, the method comprising, at the computing device:
   transitioning into a locked state under which the computing device prohibits access to at least one file that is accessible when the computing device is operating in an unlocked state;
   purging, from a volatile memory communicably coupled to the computing device, at least one encryption key, and data of at least one file that is associated with the at least one encryption key;
   receiving a request to transition into the unlocked state, wherein the request includes a password;
   utilizing the password to decrypt an encrypted key bag to produce a decrypted key bag, wherein the decrypted key bag includes a plurality of encryption keys;
   decrypting, using at least one encryption key of the plurality of encryption keys, at least one encrypted file stored on the computing device to produce a decrypted at least one file;
   in response to verifying that the decrypted at least one file matches expected data for the at least one file:
      transitioning into the unlocked state to permit access to the computing device; and
   in response to identifying that the decrypted at least one file does not match the expected data for the at least one file:
      remaining in the locked state to prohibit access to the computing device.

2. The method of claim 1, wherein prohibiting access to the computing device further comprises:
   displaying a first indication that an input of the password is invalid.

3. The method of claim 1, further comprising, prior to receiving the input of the password:
   interfacing with a security process to determine whether an input of the password is required;
   receiving a second indication from the security process that the input the password is required; and
   displaying a prompt at the computing device to input the password.

4. The method of claim 1, wherein, when the computing device transitions into the unlocked state, the computing device permits access to at least one file that is inaccessible when the computing device is operating in the locked state.

5. The method of claim 1, further comprising:
   generating a new encryption key;
   adding the new encryption key to the decrypted key bag; and
   encrypting the decrypted at least one file using the new encryption key.

6. The method of claim 1, further comprising:
   identifying at least one encryption key in the decrypted key bag that has no association with any encrypted files stored on the computing device; and
   removing the at least one encryption key from the decrypted key bag.

7. At least one non-transitory computer readable storage medium configured to store instructions that, when executed by at least one processor included in a computing device, cause the computing device to control access to the computing device, by carrying out steps that include:
   transitioning into a locked state under which the computing device prohibits access to at least one file that is accessible when the computing device is operating in an unlocked state;
   purging, from a volatile memory communicably coupled to the computing device, at least one encryption key, and data of at least one file that is associated with the at least one encryption key;
   receiving a request to transition into the unlocked state, wherein the request includes a password;
   utilizing the password to decrypt an encrypted key bag to produce a decrypted key bag, wherein the decrypted key bag includes a plurality of encryption keys;
   decrypting, using at least one encryption key of the plurality of encryption keys, at least one encrypted file stored on the computing device to produce a decrypted at least one file;
   in response to verifying that the decrypted at least one file matches expected data for the at least one file:
      transitioning into the unlocked state to permit access to the computing device; and
   in response to identifying that the decrypted at least one file does not match the expected data for the at least one file:
      remaining in the locked state to prohibit access to the computing device.

8. The at least one non-transitory computer readable storage medium of claim 7, wherein prohibiting access to the computing device further comprises:
   displaying a first indication that an input of the password is invalid.

9. The at least one non-transitory computer readable storage medium of claim 7, wherein the steps further include, prior to receiving the input of the password:
   interfacing with a security process to determine whether an input of the password is required;
   receiving a second indication from the security process that the input the password is required; and
   displaying a prompt at the computing device to input the password.

10. The at least one non-transitory computer readable storage medium of claim 7, wherein, when the computing device enters into the unlocked state, the computing device permits access to at least one file that is inaccessible when the computing device is operating in the locked state.

11. The at least one non-transitory computer readable storage medium of claim 7, wherein the steps further include:
   generating a new encryption key;
   adding the new encryption key to the decrypted key bag; and
   encrypting the decrypted at least one file using the new encryption key.

12. The at least one non-transitory computer readable storage medium of claim 7, wherein the steps further include:
   identifying at least one encryption key in the decrypted key bag that has no association with any encrypted files stored on the computing device; and
   removing the at least one encryption key from the decrypted key bag.

13. A computing device configured to control access to the computing device, the computing device comprising:
   at least one processor; and
   at least one memory storing instructions that, when executed by the at least one processor, cause the computing device to:

transition into a locked state under which the computing device prohibits access to at least one file that is accessible when the computing device is operating in an unlocked state;

purge, from a volatile memory communicably coupled to the computing device, at least one encryption key, and data of at least one file that is associated with the at least one encryption key;

receive a request to transition into the unlocked state, wherein the request includes a password;

utilize the password to decrypt an encrypted key bag to produce a decrypted key bag, wherein the decrypted key bag includes a plurality of encryption keys;

decrypt, using at least one encryption key of the plurality of encryption keys, at least one encrypted file stored on the computing device to produce a decrypted at least one file;

in response to verifying that the decrypted at least one file matches expected data for the at least one file:
   transition into the unlocked state to permit access to the computing device; and in response to identifying that the decrypted at least one file does not match the expected data for the at least one file:
   remain in the locked state to prohibit access to the computing device.

14. The computing device of claim 13, wherein prohibiting access to the computing device further comprises:
   displaying a first indication that an input of the password is invalid.

15. The computing device of claim 13, wherein the at least one processor further causes the computing device to, prior to receiving the input of the password:
   interface with a security process to determine whether an input of the password is required;
   receive a second indication from the security process that the input the password is required; and
   display a prompt at the computing device to input the password.

16. The computing device of claim 13, wherein, when the computing device enters into the unlocked state, the computing device permits access to at least one file that is inaccessible when the computing device is operating in the locked state.

17. The computing device of claim 13, wherein the at least one processor further causes the computing device to:
   generate a new encryption key;
   add the new encryption key to the decrypted key bag; and
   encrypt the decrypted at least one file using the new encryption key.

\* \* \* \* \*